May 11, 1965

K. ZWICK 3,182,403

SLIDE RULE

Filed March 26, 1963

INVENTOR
KURT ZWICK

BY

ATTORNEY.

United States Patent Office 3,182,403
Patented May 11, 1965

3,182,403
SLIDE RULE
Kurt Zwick, Munich, Germany, assignor to Wenczler & Heidenhain, Traunreut, Upper Bavaria, near Traunstein, Germany, a corporation of Germany
Filed Mar. 26, 1963, Ser. No. 268,112
Claims priority, application Germany, Mar. 26, 1962, Z 9,328
5 Claims. (Cl. 33—143)

The present invention relates to a slide rule which may include a depth rule, a height measure, or the like, with a measuring scale.

It is one object of the present invention to provide a slide rule which simplifies the reading of the set measure, which previously has been read with the help of a nonius and which improves the degree of accuracy.

Unskilled labor, yet in many instances even skilled labor, has often extreme difficulties in the reading of a nonius. This has been experienced particularly, in case the nonius is not divided over nine, but over nineteen, twenty-nine, scale lines of the measuring scale, in order to provide a reading of smaller fractions than one-tenth of the distance between adjacent scale lines.

It is another object of the present invention to provide a slide rule which avoids these difficulties.

It is still another object of the present invention to provide a slide rule in which by elimination of a nonius a single reading mark is used and in which the latter is displaceably disposed on the rule within the range of the distance between two adjacent scale lines.

It is yet another object of the present invention to provide a slide rule wherein the reading mark is formed as a forked member, which covers up one part of the length of the scale lines, so that the entire length of the scale lines is visible only between the two legs of the forked member.

If the reading mark, after setting the rule, is disposed between two scale lines, the reading mark is displaced for the reading of the measure for a length until one of the two scale lines is exactly "forked" in. The displacement corresponds thus to the amount of the measure, which has been read in known structures on the nonius.

Since contrary to the nonius reading, the reading process is now connected with the displacement of the reading mark, thus with a movement, the measuring of the displacement path can be selectively increased in its sensitivity by simple mechanical movement transmissions.

In addition, particularly in view of the forming of the mark as a forked member, an extremely exact setting of the reading mark is possible, since the eye is capable of recognizing even the smallest differences in the distances between the scale line to be "forked" in and the fork legs disposed on both sides thereof. The distance of the fork legs from each other is then greater than the width of the scale lines.

It is also a further object of the present invention to provide a slide rule which includes a cam plate to be operated manually and designed for the displacement of the reading mark, which cam plate carries a scale corresponding with an index and indicating its angular position. This scale corresponds with the previous nonius, is, however, readable much easier and clearer, since here is likewise only a single index used, instead of ten and nine lines of the nonius, respectively.

With these and other objects in view, which will become apparent in the following detailed description, the present invention will be clearly understood in connection with the accompanying drawing, in which.

Figure 1:
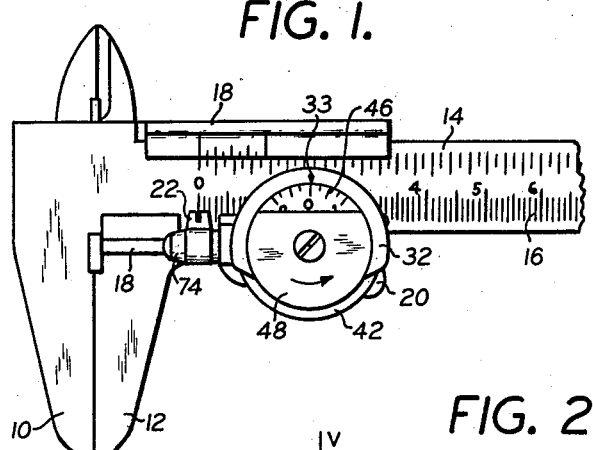
FIGURE 1 is a top plan view of a slide rule.

Referring now to the drawing, and in particular to FIG. 1, the slide rule comprises two measuring jaws 10 and 12, of which the measuring jaw 10 is integrally formed with a carrier 14 of the measuring scale 16 and the measuring jaw 12 is rigidly connected or integrally formed with the slide 18. The latter is released from its clamping position by pressure upon a clamping device 20 and can then move along the carrier 14. A reading mark disposed on the slide 18 is formed as a forked member 22.

Figure 2:
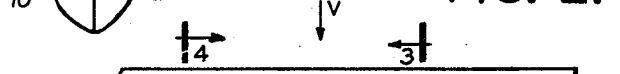
FIG. 2 is a top plan view of a portion of the slide rule shown in FIG. 1, partly in section, at an enlarged scale, and a part broken away for better demonstration, as well as with removed covering plate.
Figure 3:
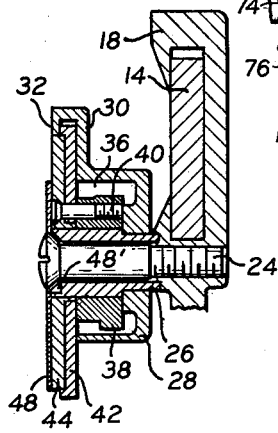
FIG. 3 is a section along the lines 3—3 of FIG. 2.
Figure 4:
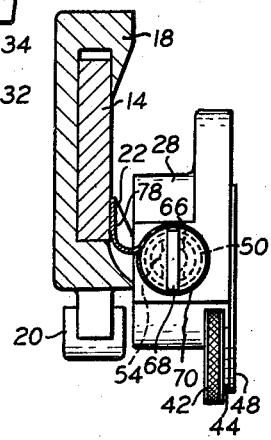
FIG. 4 is a section along the lines 4—4 of FIG. 2.

Referring now to FIGS. 2 to 4, it is readily apparent that a sleeve 26 is secured to the slide 18 by means of a counter sunk screw 24, the sleeve 26 being set off at one of its ends. A supporting member 28 sits on the set off portion of the sleeve 26, which supporting member 28 is of about eliptical shape at its lower part, as shown in FIG. 2, and its upper part is formed as a disk 30 which has an inwardly bent edge formation 32 and carries an index marker 33. The supporting member 28 is secured against rotation relative to the slide 18 by means of a pin 34.

A cam plate 38 is rotatably mounted on the sleeve 26 within a central recess 36 of the supporting member 28, which cam plate 38 is formed as a single-threaded Archimedian spiral of 1 mm. pitch and is connected with two additional disks 42 and 44 by means of three screws 40. The disk 42 is knurled at its periphery and surrounds with its bent over edge the disk 44, which in turn carries a scale 46 (FIG. 1) and fits exactly into the edge 32 of the supporting member 28.

A covering plate 48 is disposed in front of the disk 44 and leaves open one part of the scale 46, yet extends with a nose projection 48' into a groove of the rotatable sleeve 26 and is in this manner non-rotatably secured to the slide 18 by means of the screw 24.

A tube 50 is pressed into a bore 50' of the supporting member 28, which bore 50' is disposed at a right angle and radially from the annular recess 36 of the supporting member 28, which tube 50 has a slot 52 at its free end. A longitudinal hollow piston 54 is guided in the tube 50, the wall of the piston 54 having a bore 56, which receives a pin 58 set into the tube 50.

A spring 60 is disposed within the piston 54, which spring 60 engages at one end the pin 58 and at its other end the bottom of the piston 54 and thereby, pushes the piston 54 towards the cam plate 38. The bottom of the piston 54 is equipped with a set-off 62, which is at least as high as the radial jump of the single threaded spiral of the cam plate 38, which amounts to 1 mm.

The piston 54 is secured against rotation by means of a pin 64 which is pressed into the piston 54 and extends with its projecting ends into the slot 52 of the tube 50. Another bore 66 of the wall of the piston 54, spaced apart for about 90° from the bore 56, is disposed in the piston 54 to receive a pin 68 which is pressed into a sleeve 70 and which pin 68 is guided in the slot 52 of the tube 50, in the same manner as the pin 64. Two small blade springs 72 are disposed between the pins 64 and 68 inside of the piston 54. The free part of the tube 50, uncovered by the sleeve 70, is covered by a collar 73 glued thereto.

Finally, the piston 54 carries a ring 74 and a set screw 76, while the forked member 22 made of spring steel is glued to the sleeve 70. The forked member 22 engages resiliently the millimeter scale 16. The surface of the forked member 22 is blackened and matted.

A recess 78 is provided in the slide 18 within the range of the forked member 22, so that no chips and dirt can there accumulate.

The function of the described parts is performed as follows:

(1) *Displacement of the forked member 22 for reading*

It is assumed that the length measured with the slide rule amounts to 2.5 mm. In the position of the cam plate 38, shown in FIGS. 1 and 2, the slot of the forked member 22 is then situated exactly in the center between the second and third scale line of the millimeter scale 16. By counter-clockwise rotation of the knurled disk 42 with the thumb of the right hand, which grips usually the slide rule, the piston 54 and, thereby, the sleeve 70 and the forked member 22 are moved now towards the left, until the second scale line is exactly "forked" in. The scale 46 shows then on the marker 33 the value "5." The measured length of 2.5 mm. results thus from the reading on the scale 16 (2 mm.) and on the scale 46 (0.5 mm.). It is now no more necessary to make a selection from a plurality of scale-and nonius lines, rather the scale lines marked by the forked member 22 and by the index marker 33 count clearly.

It is apparent that appreciably smaller values than $\frac{1}{10}$ mm. can be read easily and clearly, which is completely impossible with a nonius of a length of 9 mm. and which is cumbersome and unsafe with a nonius of greater length. The exactness, with which the forked member 22 can be set on a scale line of the scale 16, corresponds completely with the wide stretch of the $\frac{1}{10}$-scale 46.

(2) *Adjustment of the forked member 22*

The possibility, to adjust the slide rule, is a very particular advantage of the present invention, in comparison with the known slide rules equipped with a nonius. The slide rules, designed in accordance with the present invention, permit a repeated reworking of used-up measuring jaws, which increases for many times the life of the measuring devices of the present invention.

Figure 5:
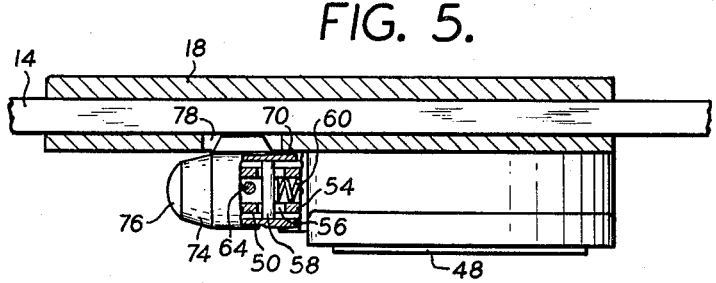
FIG. 5 is an end view of the slide rule seen in the direction of the arrow V of FIG. 2.

The adjustment is suitably performed with the measuring jaws being completely close to each other, that means in the position zero. For this purpose, the scale 46 is at first positioned at zero, as shown in FIGS. 1 and 2. By rotation of the screw 76, the sleeve 70 can be moved relative to the piston 54 towards the right (FIG. 5) by means of a ring 74. The pin 68, which is pressed into the sleeve 70 and which has play in the bore 66 of the piston 54, compresses the blade springs 72, which in turn engage the pin 64 sitting in the piston 54. Upon return rotation of the screw 76, the blade springs 72 urge the sleeve 70 towards the left relative to the piston 54. The screw 76, which is screwed into the inner thread of the piston 54, is thus always under tension in view of its engagement with the inner thread of the piston 54, so that it cannot turn by itself.

Even if the reading mark is not formed as a forked member, rather as a line, which is to be brought into coincidence with a scale line of the measuring scale, the present invention provides the advantage that a single line only has to be observed on the slide, instead of ten or more lines of the nonius.

The setting of a predetermined value between the measuring jaws is simplified, if the slide consists of two parts, one of which is clamped tightly on the carrier 14, after approximate setting of the value, and is connected with the other part formed as a measuring jaw and carrying the reading mark, by means of a set screw.

The present invention is suitably also applicable in the same manner to measuring devices having an inch-scale and provides there the possibility to achieve a reading exactness of $\frac{1}{1000}$ nich, upon using suitable dimensions of the scale disk 44.

While I have disclosed one embodiment of the present invention, it is to be understod that this embodiment is given by example only and not in a limiting sense, the scope of the present invention being determined by the objects and the claims.

I claim:
1. A slide rule comprising
   a longitudinal carrier bearing a main measuring scale thereon,
   a slide extending parallel to and at least partly surrounding said longitudinal carrier,
   means permitting movement of said slide in longitudinal direction of said longitudinal carrier,
   two measuring jaws,
   one of said measuring jaws being connected with said longitudinal carrier and the other of said measuring jaws being connected with said slide,
   said slide having a marker index and the latter being movable relative to said slide along said carrier to bring into alignment said marker index with the next lower scale line of said measuring scale of said carrier,
   said slide including a supporting member having a central recess,
   a cam plate rotatably mounted in said central recess of said supporting member and formed as an Archimedean spiral disposed parallel to the face of said longitudinal carrier,
   a piston resiliently mounted in said slide for resilient engagement with said cam plate,
   an operating disk disposed coaxially with and operatively connected with said cam plate,
   said operating disk having an auxiliary scale thereon,
   the diameter of said operating disk being larger than the largest diameter of said cam plate, and the adjustment of said operating disk being readable on said auxiliary scale, and
   said marker index being formed as a forked member to operate as a reading mark, and connected with said piston, so that the position of said forked member is responsive to the position of said cam plate by means of said piston.
2. The slide rule, as set forth in claim 1, wherein a portion of said forked member covers a part of said scale lines.
3. The slide rule, as set forth in claim 1, which includes an operating grip disposed on said slide, and wherein the periphery of said operating disk is disposed directly adjacent said operating grip.
4. The slide rule, as set forth in claim 1, which includes a tube mounted in said slide and having longitudinal slots,
   a pin disposed crosswise in said tube,
   said piston being guided axially in said tube by means of said pin,
   a spring engaging said pin,
   a set screw carried by said piston, and
   said spring urging said forked member against said set screw.
5. The slide rule, as set forth in claim 4, wherein said piston is hollow and which includes another spring urging said piston toward said cam plate, and said hollow piston receiving said another spring as well as said spring.

References Cited by the Examiner
UNITED STATES PATENTS

| 384,771 | 6/88 | MacDonald | 33—165 |
| 389,734 | 9/88 | Bishop | 33—165 |
| 2,325,767 | 8/43 | Glouton | 33—147 |
| 2,554,099 | 5/51 | Ermold | 33—143 X |

FOREIGN PATENTS

| 184,168 | 7/72 | Great Britain. |

ISAAC LISANN, *Primary Examiner*.